No. 764,735.

Patented July 12, 1904.

UNITED STATES PATENT OFFICE.

RICHARD LAUCH, OF UERDINGEN, GERMANY.

PROCESS OF MAKING SULFUR DYES STABLE.

SPECIFICATION forming part of Letters Patent No. 764,735, dated July 12, 1904.

Application filed February 15, 1902. Serial No. 94,201. (No specimens.)

*To all whom it may concern:*

Be it known that I, RICHARD LAUCH, doctor of philosophy, a subject of the Emperor of Germany, residing at Uerdingen-on-the-Rhine, Germany, have invented certain new and useful Improvements in Processes of Making Sulfur Dyes Stable, of which the following is a specification, and for which I obtained Letters Patents in France the 29th of July, 1901, No. 313,052, Vol. 41 N, 60,435, and in Italy the 16th of July, 1901, Vol. 144 N, 246.

This invention relates to an improved process for manufacturing permanent dyestuffs containing sulfur.

When para-amido-dinitro-diphenylamin obtained by the reaction of 1.3.4 dinitro-chlorbenzene upon paraphenylene diamin is subjected to the action of sulfur and alkaline sulfids, as described, for instance, in my specifications Nos. 69,036 and 69,037, very valuable dark blue to black dyestuffs are obtained. In order to render these dyestuffs suitable for use, they must be finely powdered in order to be more easily soluble. In this condition the dyestuffs experience a further transformation, which may be considered as a subsequent oxidation, the powdered state rendering this oxidation possible by allowing the access of air to the material, while with the solid melt or hard lumps this was not possible. This subsequent oxidation takes place with a considerable development of heat up to temperatures of 200° centigrade and even to spontaneous ignition. If the dyestuffs are not exposed to the direct action of the air, but stored in closed vessels—for instance, barrels—the heating takes place more slowly and does not reach the high temperature of more than 200° centigrade; but after storage for some months frequently temperatures up to 80° are to be noticed. This continued heating of the powder, however, produces great disadvantages, as the shade of the dye, as well as its efficiency, is injuriously affected thereby. The dyeing baths of such stored dyestuffs also show a large separation of sulfur, which does not at all occur with the freshly-prepared dyestuff. I have found out that the subsequent oxidation under the direct action of the air can be so conducted that the injury to the dyestuff is obviated. When the powdered dyes are exposed to air, the heating continues, as has been found, only a certain time—about three days. If, however, the powder is regularly stirred during the exposure, the rise of the temperature, which otherwise may exceed 200° and rise to spontaneous combustion, will be reduced to less than 100° centigrade. When once cooled, no further heating of the dyestuff takes place. The physical properties of the dyestuff are not much altered. Only the dyeing power is somewhat reduced by the absorption of moisture, which is balanced by a corresponding increase in weight. The dyestuff dissolves a little more difficultly in water than the non-oxidized dyestuff.

The following is an example of the manner of carrying out this process: The black dyestuff prepared, as stated in the said patent specification, by melting para-amido-dinitro-diphenylamin with sulfur and alkaline sulfid is spread in a powdered state in moderately thick layers and repeatedly turned over, especially when a high temperature has been reached. The greatest increase of temperature shows itself on the second day. If about ten per cent. of moisture is added by means of water to the powder, the temperature rises at once to 40° and in a short time to 100°. If not moistened, the dyestuff shows a rise of temperature only after about one day's exposure. When a normal condition has been reached, complete oxidation has occurred and the dyestuff may be considered permanent. The dyestuffs thus obtained form a black powder, are little hygroscopic, difficultly soluble in water, but easily soluble with addition of alkaline sulfids, form green to bluish color. Cotton is dyed a deep black in an alkaline bath containing common salt, which dyes are advantageously influenced by subsequent treatment with metallic salts.

Having now described my invention and in what manner the same can be performed, what I claim as new is—

The process of making sulfur dyes stable consisting in exposing the dyestuffs obtained by the action of sulfur and alkaline sulfids on para-amido-dinitro-diphenylamin, in a powdered state, to the action of air.

In witness whereof I have hereunto set my hand in presence of two witnesses.

RICHARD LAUCH.

Witnesses:
T. F. HENSHEY,
HANS M. MÜLLER.